(12) United States Patent
Lee

(10) Patent No.: US 9,180,785 B2
(45) Date of Patent: Nov. 10, 2015

(54) SYSTEM AND METHOD OF CONTROLLING LOW-VOLTAGE DC/DC CONVERTER FOR ELECTRIC VEHICLE

(71) Applicant: Hyundai Motor Company, Seoul (KR)

(72) Inventor: Min-Woo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 226 days.

(21) Appl. No.: 13/967,762

(22) Filed: Aug. 15, 2013

(65) Prior Publication Data
US 2014/0306668 A1  Oct. 16, 2014

(30) Foreign Application Priority Data

Apr. 11, 2013 (KR) .................. 10-2013-0039623

(51) Int. Cl.
*B60L 11/18* (2006.01)

(52) U.S. Cl.
CPC .......... *B60L 11/1838* (2013.01); *Y02T 10/7005* (2013.01); *Y02T 90/121* (2013.01); *Y02T 90/128* (2013.01); *Y02T 90/14* (2013.01); *Y02T 90/163* (2013.01)

(58) Field of Classification Search
CPC ................................................. B60L 11/1838
USPC ........................................................ 320/152
See application file for complete search history.

(56) References Cited

U.S. PATENT DOCUMENTS

2013/0307489 A1* 11/2013 Kusch et al. .................. 320/162

FOREIGN PATENT DOCUMENTS

| JP | 07107619 A | 4/1995 |
|----|----|----|
| JP | 2006174619 A | 6/2006 |
| JP | 2010136495 A | 6/2010 |
| JP | 2010200529 A | 9/2010 |
| JP | 2010226776 A | 10/2010 |
| JP | 2012080689 A | 4/2012 |
| JP | 2012-249462 A | 12/2012 |
| KR | 10-2002-0044297 | 6/2002 |
| KR | 10-2005-0047221 A | 5/2005 |
| KR | 10-2008-0014395 | 2/2008 |
| KR | 10-2011-0054152 | 5/2011 |
| KR | 10-2011-0054982 | 5/2011 |
| KR | 10-2012-0012660 A | 2/2012 |

* cited by examiner

*Primary Examiner* — Thuan Do
(74) *Attorney, Agent, or Firm* — Mintz Levin Cohn Ferris Glovsky and Popeo, P.C.; Peter F. Corless

(57) ABSTRACT

A system and method of controlling a low-voltage DC/DC converter for an electric vehicle that include a battery sensor that senses information regarding a low-voltage battery during a stop of the electric vehicle for each first period when the electric vehicle stops and a controller that operates a low-voltage DC/DC converter to charge the low-voltage battery for a predefined time when an error occurs in the battery sensor. In addition, the controller determines a charge time of the low-voltage battery based on first SOC values of the information regarding the low-voltage battery sensed for each first period when no error in the battery sensor is detected and operates the low-voltage DC/DC converter for the determined charge time to charge the low-voltage battery.

7 Claims, 7 Drawing Sheets

FIG.2

| BATTERY SOC | 50% | 60% | 70% | 80% | 90% | 100% |
|---|---|---|---|---|---|---|
| CHARGE TIME(min) | 20 | 15 | 10 | 5 | 0 | 0 | ns in its entirety.

SYSTEM AND METHOD OF CONTROLLING LOW-VOLTAGE DC/DC CONVERTER FOR ELECTRIC VEHICLE

CROSS-REFERENCE(S) TO RELATED APPLICATIONS

This application claims priority to Korean Patent Application No. 10-2013-0039623, filed on Apr. 11, 2013, which is incorporated herein by reference in its entirety.

BACKGROUND

1. Field of the Invention

Exemplary embodiments of the present invention relate to a system and method of controlling a low-voltage DC/DC converter for an electric vehicle; and, particularly, to a system and method of controlling a low-voltage DC/DC converter for an electric vehicle, which control a low-voltage DC/DC converter to efficiently charge a low-voltage battery.

2. Description of Related Art

In general, a hybrid electric vehicle includes a power source and a drive motor powered by a battery, and may improve fuel efficiency with the aid of the motor driven by the voltage of the battery during a start or acceleration of the vehicle by applying the power source to a front wheel.

A superior control unit which collectively operates the electric vehicle is an HCU (Hybrid Control Unit) or a VCU (Vehicle Control Unit). The HCU or the VCU communicates with an MCU (Motor Control Unit), which is a subordinate control unit, to maintain torque and speed of the motor as a drive source and a torque generation amount, and communicates with an ECU (Engine Control Unit), which operates the engine to generate power for voltage generation as an auxiliary power source, to perform relay control related to engine start and fault diagnosis.

In addition, the HCU detects temperature, voltage, current, SOC (State Of Charge), etc. of the battery as a main power source and communicates with a BMS (Battery Management System) which manages all conditions of the battery, to maintain the torque and speed of the motor based on the SOC. Furthermore, the HCU communicates with a TCU (Transmission Control Unit), which determines and maintains a shift ratio based on vehicle speed and a driving intention, to cause a desired speed to be maintained. The communication between the HCU as a superior control unit and the subordinate control units is performed via CAN communication to exchange information and transmit and receive control signals with respect to each other.

Meanwhile, the electric vehicle includes a low-voltage DC/DC (direct current) converter, (e.g., a DC/DC converter) which generates a direct current by rectifying power of a high-voltage battery. Such a low-voltage DC/DC converter switches a high-voltage DC to generate an AC (alternating current), transforms the AC using a coil, a transformer, or a capacitance, and then rectifies the AC again to generate a DC, thereby serving to supply each electric device of the electric vehicle with the generated DC.

In general, a low-voltage DC/DC converter control system for an electric vehicle operates the low-voltage DC/DC converter without utilization of information regarding a low-voltage battery. For example, the low-voltage DC/DC converter may output a fixed voltage of about 14.3V by operating the low-voltage DC/DC converter control system. Therefore, since unnecessary power is consumed due to the continuous high-voltage output (that is, about 14.3V) of the low-voltage DC/DC converter, a mileage of the electric vehicle by one charge may be reduced.

In addition, the low-voltage DC/DC converter control system for an electric vehicle supplies charge power to the low-voltage battery, regardless of the state of the low-voltage battery. Thus, it may be difficult to efficiently manage discharge of the low-voltage battery caused by a dark current generating unit such as a black box mounted within the vehicle when the vehicle remains idle for a predetermined period of time. Furthermore, a battery life may be reduced due to overcharge and gassing phenomena by continuous charge of the low-voltage battery when the electric vehicle is charged.

SUMMARY

The present invention provides a system and method of controlling a low-voltage DC/DC converter for an electric vehicle that increases mileage of an electric vehicle by one charge and durability of a low-voltage battery by performing control of a low-voltage DC/DC converter based on a state of the low-voltage battery via feedback control utilizing information regarding a low-voltage battery sensor.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method of controlling a low-voltage DC/DC converter for an electric vehicle, which controls a low-voltage DC/DC converter to efficiently charge a low-voltage battery, may include sensing information regarding a low-voltage battery when the electric vehicle is stopped for each first period when the electric vehicle stops; and controlling a low-voltage DC/DC converter to charge the low-voltage battery for a predefined time period when an error occurs in a battery sensor to sense the information regarding the low-voltage battery while the electric vehicle is stopped, determining a charge time of the low-voltage battery based on first SOC values of the information of the low-voltage battery sensed for each first period when the battery sensor is normal, and operating the low-voltage DC/DC converter for the determined charge time to charge the low-voltage battery.

The method of controlling a low-voltage DC/DC converter for an electric vehicle may further include sensing information regarding the low-voltage battery while the electric vehicle is driven; and determining target voltage values of the low-voltage DC/DC converter based on second SOC values and battery liquid temperature values of the information regarding the low-voltage battery during the driving of the electric vehicle, and operating the low-voltage DC/DC converter based on the determined target voltage values.

In the controlling of the low-voltage DC/DC converter, the determination of the target voltage values may use a first target voltage table that includes voltage values of the low-voltage DC/DC converter which are respectively defined in advance with respect to the low-voltage battery SOC values and the battery liquid temperature values to increase mileage of the electric vehicle by one charge. In the first target voltage table, when the low-voltage battery SOC values are in a range of about 80 to 90% and the battery liquid temperature values are in a range of about 0 to 40° C., the predefined voltage values of the low-voltage DC/DC converter may be within a range of about 12.2 to 13.2V.

In accordance with another embodiment of the present invention, a method of controlling a low-voltage DC/DC converter for an electric vehicle, which operates a low-voltage DC/DC converter to efficiently charge a low-voltage battery, may include sensing information regarding a low-voltage battery when an external charge power source is connected after an electric vehicle is stopped; and determining target voltage values of a low-voltage DC/DC converter based on third SOC values and battery liquid temperature values of the information regarding the low-voltage battery sensed during the connection of the external charge power source, and operating the low-voltage DC/DC converter based on the determined target voltage values.

In the controlling of the low-voltage DC/DC converter, the determination of the target voltage values may be performed using a second target voltage table that includes voltage values of the low-voltage DC/DC converter which are respectively defined in advance with respect to the low-voltage battery SOC values and the battery liquid temperature values to reduce overcharge and gassing phenomena of the low-voltage battery.

In accordance with another embodiment of the present invention, a low-voltage DC/DC converter control system, which operates a low-voltage DC/DC converter to efficiently charge a low-voltage battery, may include a low-voltage DC/DC converter mounted between a high-voltage battery and a low-voltage battery for an electric vehicle and bi-directionally raises or lowers a voltage; and a low-voltage DC/DC converter controller that includes a sensing module which senses information regarding the low-voltage battery during stop of the electric vehicle for each first period when the electric vehicle stops, and a control module which operates the low-voltage DC/DC converter to charge the low-voltage battery for a predefined time when an error occurs in a battery sensor to sense the information regarding the low-voltage battery during the stop of the electric vehicle, determines a charge time of the low-voltage battery based on first SOC values of the information of the low-voltage battery sensed for each first period when the battery sensor is normal, and operates the low-voltage DC/DC converter for the determined charge time to charge the low-voltage battery.

The sensing module may sense information regarding the low-voltage battery while the electric vehicle is driven, and the control module may determine target voltage values of the low-voltage DC/DC converter based on second SOC values and battery liquid temperature values of the information regarding the low-voltage battery while the electric vehicle is driven, and operate the low-voltage DC/DC converter based on the determined target voltage values.

The determination of the target voltage values in the control module may be performed using a first target voltage table that includes voltage values of the low-voltage DC/DC converter which are respectively defined in advance with respect to the low-voltage battery SOC values and the battery liquid temperature values to increase mileage of the electric vehicle by one charge. In the first target voltage table, when the low-voltage battery SOC values are in a range of about 80 to 90% and the battery liquid temperature values are in a range of about 0 to 40° C., the predefined voltage values of the low-voltage DC/DC converter may be within a range of about 12.2 to 13.2V.

The sensing module may sense information of the low-voltage battery when an external charge power source is connected after stop of the electric vehicle, and the control module may determine target voltage values of the low-voltage DC/DC converter based on third SOC values and battery liquid temperature values of the information of the low-voltage battery sensed during the connection of the external charge power source, and operate the low-voltage DC/DC converter based on the determined target voltage values.

The determination of the target voltage values in the control module may be performed using a second target voltage table that includes voltage values of the low-voltage DC/DC converter which are respectively defined in advance with respect to the low-voltage battery SOC values and the battery liquid temperature values such that overcharge and gassing phenomena of the low-voltage battery are reduced.

BRIEF DESCRIPTION OF THE DRAWINGS

FIG. 2 is an exemplary charge time determination table indicated at step S130 of FIG. 1 in according with the first exemplary embodiment of the present invention;

DETAILED DESCRIPTION

Figure 1:
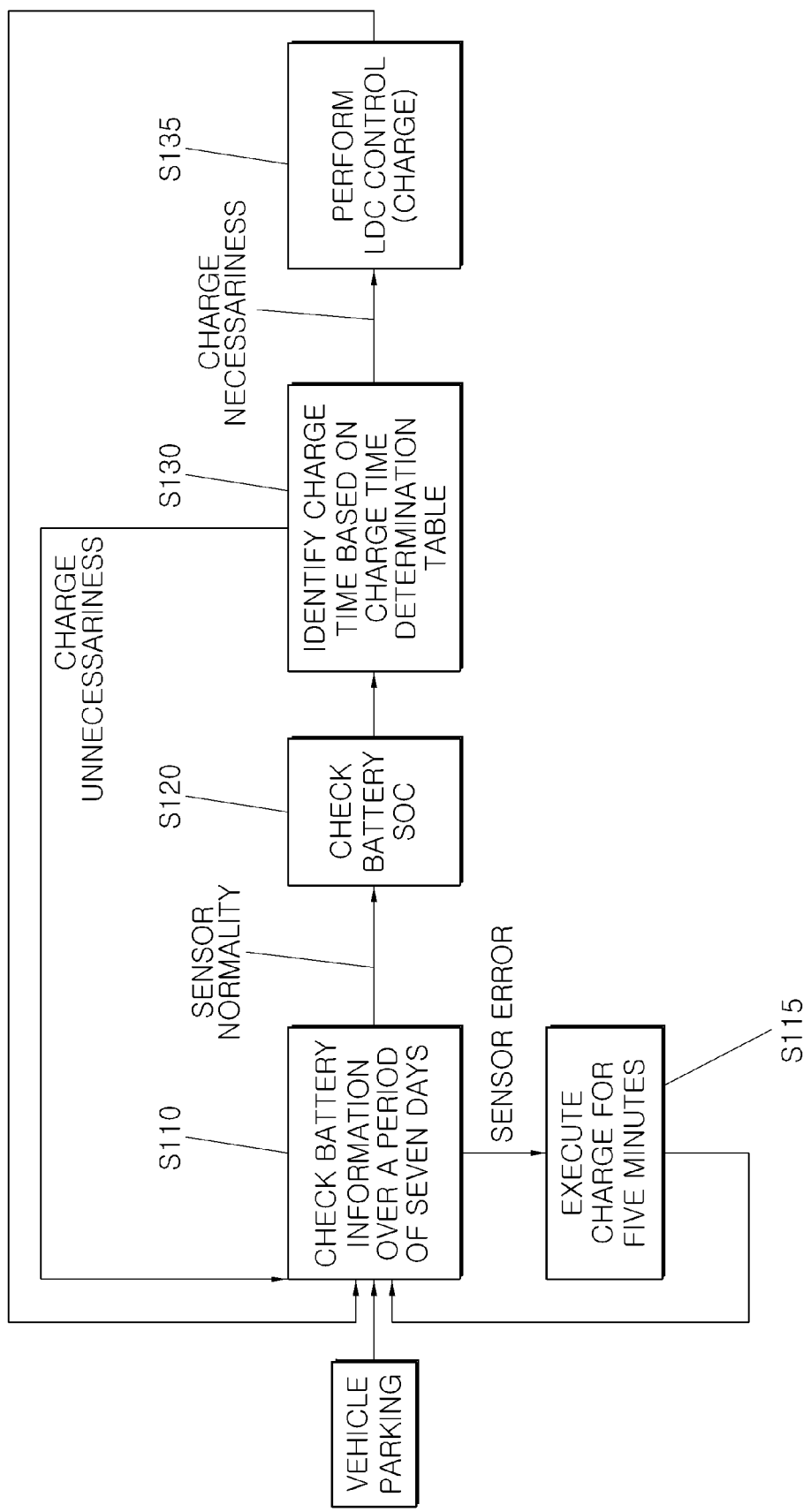
FIG. 1 is an exemplary block diagram illustrating a method of controlling a low-voltage DC/DC converter for an electric vehicle in accordance with a first exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

Hereinafter, a method of controlling a low-voltage DC/DC converter for an electric vehicle in accordance with a first exemplary embodiment of the present invention will be described with reference to FIGS. 1 and 2. FIG. 1 is an exemplary block diagram illustrating a method of controlling a low-voltage DC/DC converter for an electric vehicle. FIG. 2 is an exemplary charge time determination table indicated at step S130 of FIG. 1.

First, the method of controlling a low-voltage DC/DC converter for an electric vehicle may be configured to sense information regarding a low-voltage battery during stop of an electric vehicle for each first period defined in advance when the electric vehicle stops (S110). The predefined first period may be determined based on discharge of the low-voltage battery which may be generated when the electric vehicle remains idle for a substantial period of time (e.g., seven days). The first period may be differently determined depending on specifications of the electric vehicle. In other words, the method of controlling a low-voltage DC/DC converter may be configured to request, by a controller, information from a battery sensor and receive the battery information when the electric vehicle is idle.

Additionally, the method of controlling a low-voltage DC/DC converter for an electric vehicle may be configured to operate a low-voltage DC/DC converter to charge the low-voltage battery for a predefined time when an error occurs in the battery sensor (S115). The predefined time for emergency charge may be set as about five minutes. Such a time for emergency charge may be changed variously depending on design specifications. In addition, the controller may be configured to detect first SOC values using the battery sensor when the battery sensor is normal (e.g., when error or failure has not occurred in the battery sensor) (S120), determine a charge time of the low-voltage battery based on the first SOC values (S130), and operate the low-voltage DC/DC converter for this charge time to charge the low-voltage battery (S135).

In accordance with the method of controlling a low-voltage DC/DC converter for an electric vehicle according to the first exemplary embodiment, it may be possible to prevent a start failure of the vehicle due to discharge by compensating dark current consumption and a battery discharge amount by drive of a black box or the like, and to enhance a life of the low-voltage battery.

Figure 3:
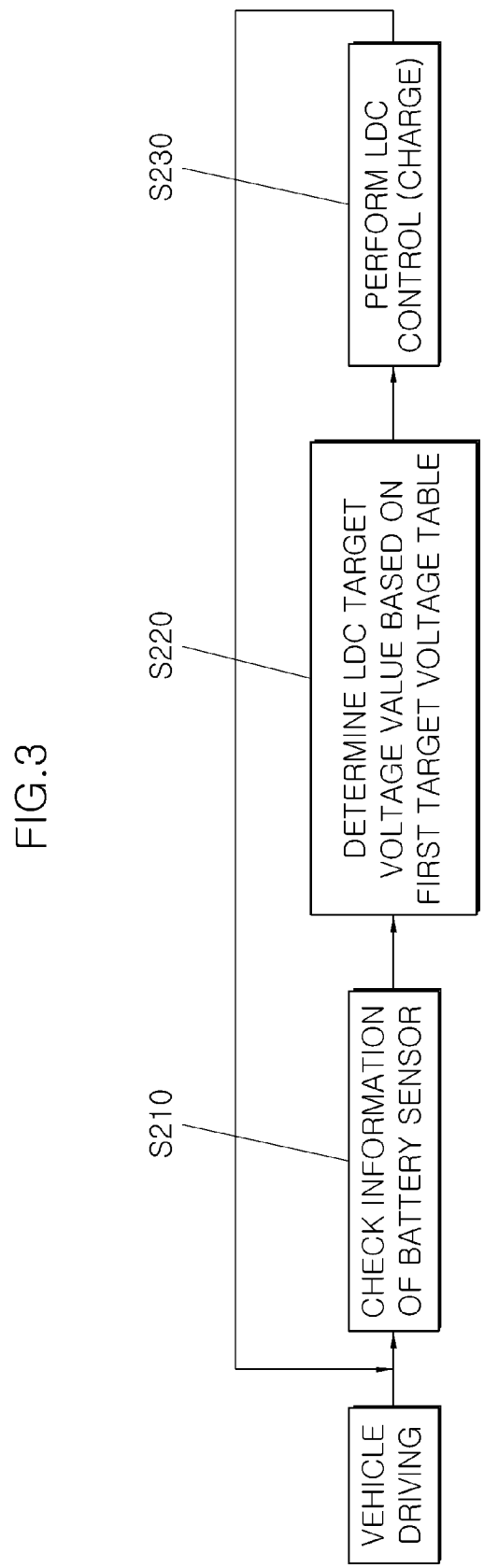
FIG. 3 is an exemplary block diagram illustrating a method of controlling a low-voltage DC/DC converter for an electric vehicle in accordance with a second exemplary embodiment of the present invention.
Figure 4:
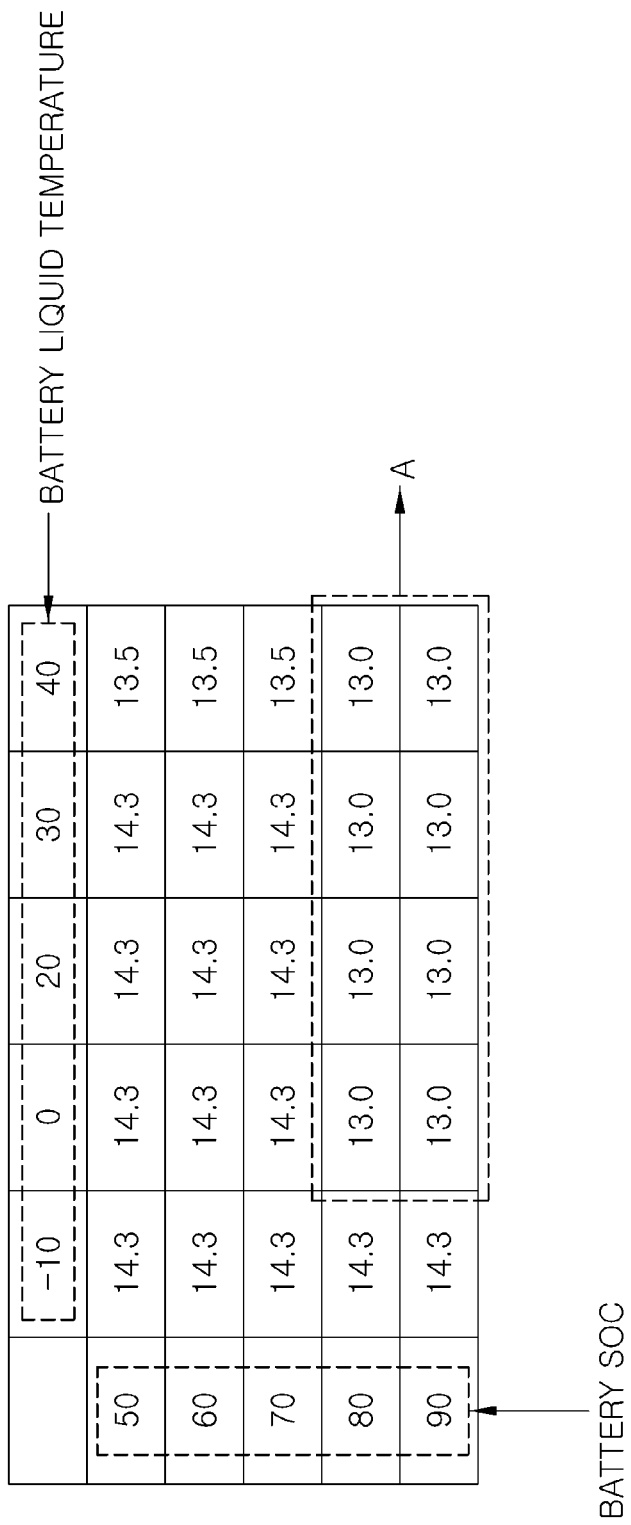
FIG. 4 is an exemplary first target voltage table indicated at step S220 of FIG. 3 in accordance with the second exemplary embodiment of the present invention.

Hereinafter, a method of controlling a low-voltage DC/DC converter for an electric vehicle in accordance with a second exemplary embodiment of the present invention will be described with reference to FIGS. 3 and 4. FIG. 3 is an exemplary block diagram illustrating a method of controlling a low-voltage DC/DC converter for an electric vehicle. FIG. 4 is an exemplary first target voltage table indicated at step S220 of FIG. 3.

First, the method of controlling a low-voltage DC/DC converter for an electric vehicle may include sensing information regarding a low-voltage battery using a battery sensor while an electric vehicle is driven (S210). In addition, a controller may be configured to determine target voltage values of a low-voltage DC/DC converter based on second SOC values and battery liquid temperature values of the information regarding the low-voltage battery while the electric vehicle is driven (S220). The determination of the target voltage values may be performed using a first target voltage table that includes voltage values of the low-voltage DC/DC converter which are respectively defined in advance with respect to the low-voltage battery SOC values and battery liquid temperature values to increase mileage of the electric vehicle by one charge.

As shown in FIG. 4, in the first target voltage table, the voltage values of the low-voltage DC/DC converter may be set lower in conditions defined for the low-voltage battery SOC values and battery liquid temperature values to increase the mileage by one charge using charge power of the low-voltage battery during the driving of the electric vehicle. In other words, as shown in "A" of FIG. 4, when the low-voltage battery SOC values are in a range of about 80 to 90% and the battery liquid temperature values are in a range of about 0 to 40° C., the predefined voltage values of the low-voltage DC/DC converter may be about 13.5V within a range of 12.2 to 13.2V. Here, the maximum voltage value of the low-voltage DC/DC converter is about 14.8V.

In accordance with the method of controlling a low-voltage DC/DC converter for an electric vehicle, it may be possible to increase the mileage by one charge since variable control of the low-voltage DC/DC converter may be actively achieved by further decreasing the voltage of the low-voltage DC/DC converter in a SOC HIGH region, compared to an existing method. In addition, the method of controlling a low-voltage DC/DC converter for an electric vehicle may prevent battery discharge by increasing the voltage of the low-voltage DC/DC converter in a SOC LOW region. Furthermore, a gassing phenomenon may be prevented by decreasing the voltage of the low-voltage DC/DC converter in a high-temperature region of the battery liquid temperature.

Furthermore, the method of controlling a low-voltage DC/DC converter for an electric vehicle may include operating, by the controller, the low-voltage DC/DC converter based on the target voltage values of the low-voltage DC/DC converter determined at step S220 to charge the battery (S230).

In accordance with the method of controlling a low-voltage DC/DC converter for an electric vehicle according to the second exemplary embodiment, it may be possible to increase the mileage by one charge by performing voltage control of the low-voltage DC/DC converter depending on the low-voltage battery SOC (battery liquid temperature) instead of voltage control of the low-voltage DC/DC converter depending on a driving mode (acceleration, deceleration, or constant speed) of the vehicle. In addition, according to the second exemplary embodiment, it may be possible to increase the mileage by one charge compared to an existing vehicle by decreasing the target voltage of the low-voltage DC/DC converter when the vehicle is driven, using the low-voltage battery charged via a charge process of the vehicle.

The electric vehicle should be charged for driving, and thus, the low-voltage battery may also be charged. In other words, the low-voltage battery may be almost fully charged during the driving of the vehicle. In accordance with the method of controlling a low-voltage DC/DC converter for an electric vehicle according to the second exemplary embodiment, it may be possible to increase the mileage by one charge compared to an existing vehicle by decreasing the target voltage of the low-voltage DC/DC converter when the vehicle is driven, using the low-voltage battery charged through the above charge process of the vehicle. Moreover, it may be possible to enhance durability of the battery by controlling the voltage based on the battery information.

Figure 5:
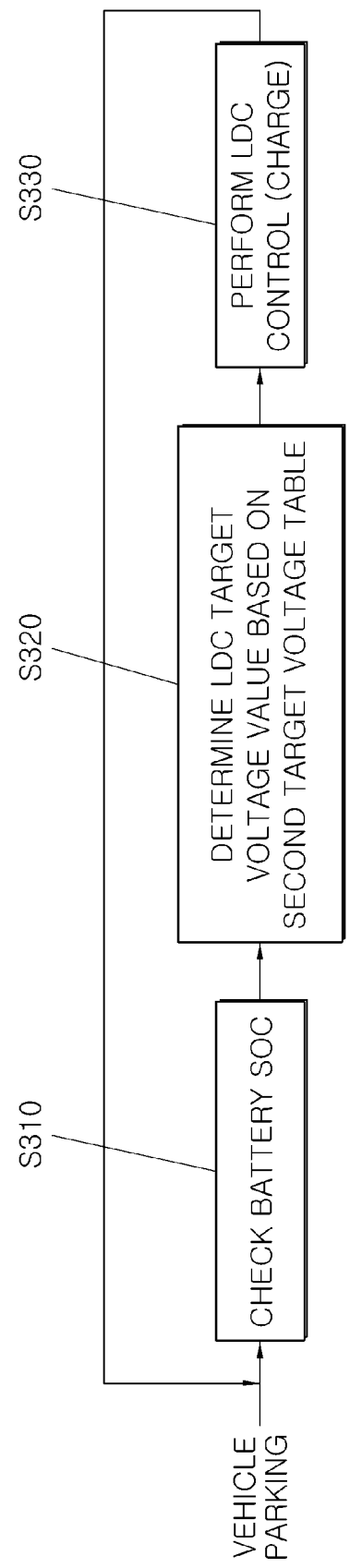
FIG. 5 is an exemplary block diagram illustrating a method of controlling a low-voltage DC/DC converter for an electric vehicle in accordance with a third exemplary embodiment of the present invention.
Figure 6:
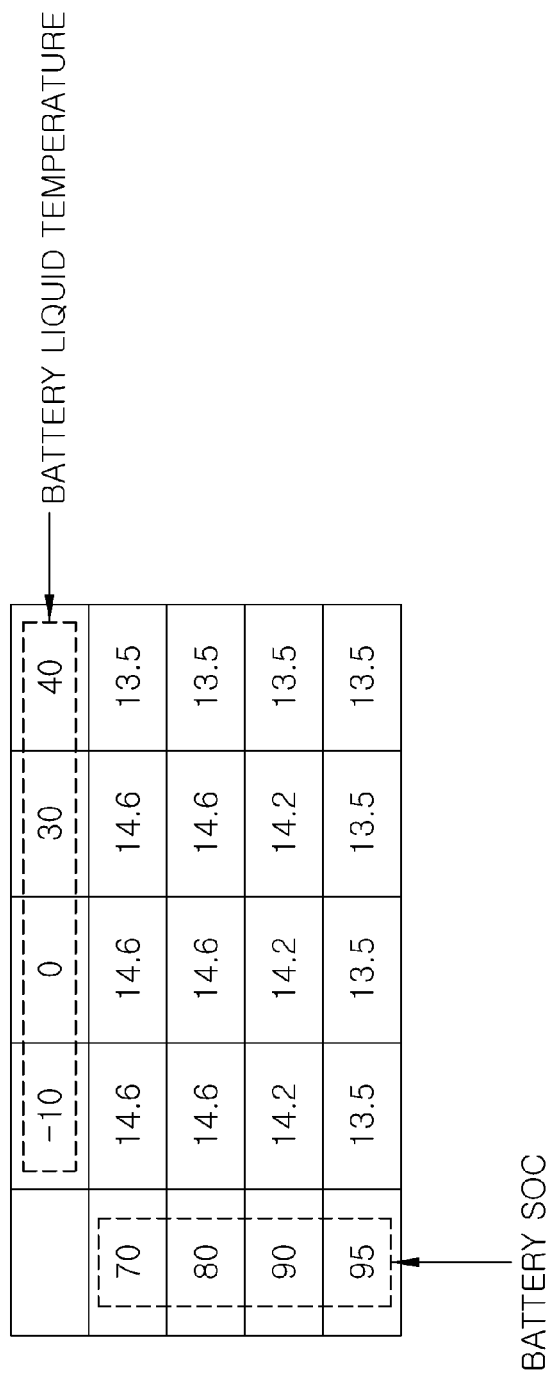
FIG. 6 is exemplary a first target voltage table indicated at step S320 of FIG. 5 in accordance with the third exemplary embodiment of the present invention.
Figure 7:
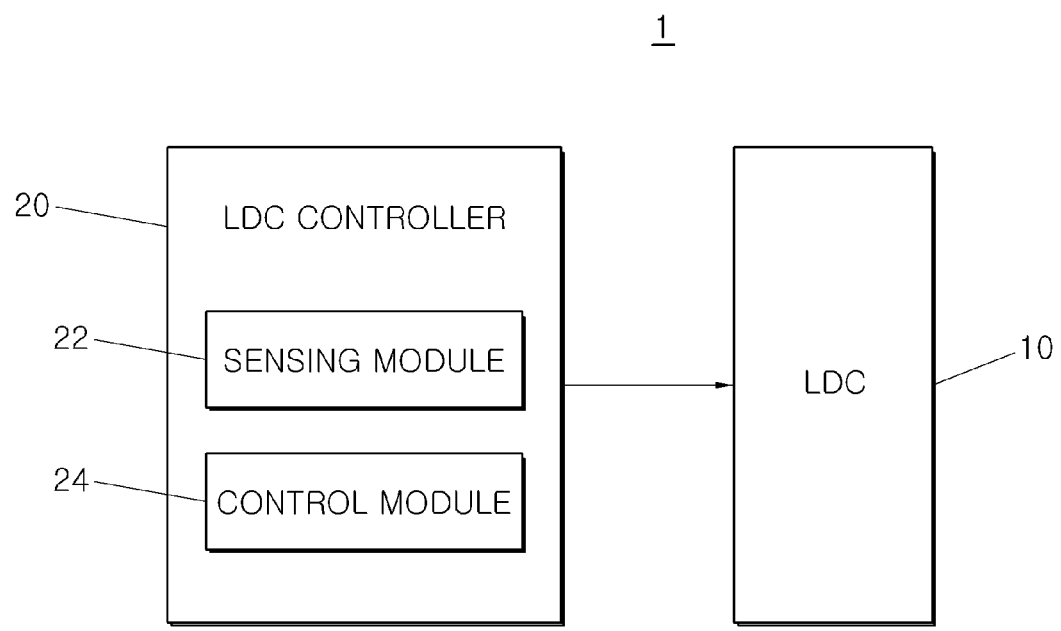
FIG. 7 is an exemplary block diagram illustrating a low-voltage DC/DC converter control system in accordance with a fourth exemplary embodiment of the present invention.

Hereinafter, a method of controlling a low-voltage DC/DC converter for an electric vehicle in accordance with a third exemplary embodiment of the present invention will be described with reference to FIGS. 5 to 7. FIG. 5 is an exemplary block diagram illustrating a method of controlling a low-voltage DC/DC converter for an electric vehicle. FIG. 6 is an exemplary first target voltage table indicated at step S320 of FIG. 5.

First, the method of controlling a low-voltage DC/DC converter for an electric vehicle in accordance with the third exemplary embodiment includes sensing information regarding a low-voltage battery using a battery sensor when an external charge power source is connected after stop of an electric vehicle (S310). In addition, a controller may be configured to determine target voltage values of a low-voltage DC/DC converter based on third SOC values and battery liquid temperature values of the information regarding the low-voltage battery sensed during the connection of the external charge power source (S320), and operate the low-voltage DC/DC converter based on the determined target voltage values to charge the low-voltage battery (S330).

Referring to FIG. 6, at step S320, the determination of the target voltage values of the low-voltage DC/DC converter may be performed using a second target voltage table that includes voltage values of the low-voltage DC/DC converter which are respectively defined in advance with respect to the low-voltage battery SOC values and liquid temperature values such that overcharge and gassing phenomena of the low-voltage battery are reduced.

In accordance with the method of controlling a low-voltage DC/DC converter for an electric vehicle according to the third exemplary embodiment, it may be possible to enhance durability of the low-voltage battery by determining the battery SOC and liquid temperature state and adjusting the output voltage of the low-voltage DC/DC converter. In the prior art, the charge is performed at a voltage of about 14.3 V for three hours from start, and is performed at a voltage of about 13.5V after the lapse of three hours. Therefore, the overcharge and gassing phenomena of the low-voltage battery occur, and thus a battery life may decrease.

Hereinafter, a low-voltage DC/DC converter control system in accordance with a fourth exemplary embodiment of the present invention will be described with reference to FIG. 7. FIG. 7 is an exemplary block diagram illustrating a low-voltage DC/DC converter control system.

The low-voltage DC/DC converter control system 1 may include a low-voltage DC/DC converter 10 mounted between a high-voltage battery and a low-voltage battery for an electric vehicle and configured to bi-directionally raise or lower a voltage, and a low-voltage DC/DC converter controller 20 configured to charge the low-voltage battery by operating the low-voltage DC/DC converter 10. The low-voltage DC/DC converter controller 20 may include a sensing module 22 and a control module 24, and may perform the method of operating a low-voltage DC/DC converter for an electric vehicle according to the above-mentioned first to third embodiments. To perform the above-mentioned method of controlling a low-voltage DC/DC converter for an electric vehicle according to the first exemplary embodiment, the low-voltage DC/DC converter controller 20 may be configured to perform the following operation.

In addition, to perform the above-mentioned method of controlling a low-voltage DC/DC converter for an electric vehicle according to the first exemplary embodiment, the sensing module 22 may be configured to sense information regarding the low-voltage battery during stop of the electric vehicle for each first period defined in advance when the electric vehicle stops. The control module 24 may be configured to operate the low-voltage DC/DC converter 10 to charge the low-voltage battery for a predefined time when an error occurs in a battery sensor to sense the information regarding the low-voltage battery during the stop of the vehicle. Further, the control module 24 may be configured to determine a charge time of the low-voltage battery based on first SOC values of the information regarding the low-voltage battery sensed for each one period when the battery sensor is normal, and operate the low-voltage DC/DC converter 10 for the determined charge time to charge the low-voltage battery.

To perform the above-mentioned method of controlling a low-voltage DC/DC converter for an electric vehicle according to the second exemplary embodiment, the low-voltage DC/DC converter controller 20 may be configured to perform the following operation.

In particular, the sensing module 22 may be configured to sense information regarding the low-voltage battery during driving of the electric vehicle. The control module 24 may be configured to determine target voltage values of a low-voltage DC/DC converter based on second SOC values and battery liquid temperature values of the information regarding the low-voltage battery during the driving of the electric vehicle, using a first target voltage table shown in FIG. 4, and operate the low-voltage DC/DC converter 10 based on the determined target voltage values to charge the low-voltage battery.

Moreover, to perform the above-mentioned method of controlling a low-voltage DC/DC converter 10 for an electric vehicle according to the third exemplary embodiment, the low-voltage DC/DC converter controller 20 may be configured to perform the following operation.

The sensing module 22 may be configured to sense information of the low-voltage battery when an external charge power source is connected after the vehicle is stopped. The control module 24 may be configured to determine target voltage values of a low-voltage DC/DC converter 10 based on third SOC values and battery liquid temperature values of the information of the low-voltage battery sensed during the connection of the external charge power source, using a second target voltage table shown in FIG. 6, and operate the low-voltage DC/DC converter 10 based on the determined target voltage values to charge the low-voltage battery.

In accordance with the method of controlling a low-voltage DC/DC converter for an electric vehicle and the low-voltage DC/DC converter control system 1 using the same according to the exemplary embodiments of the present invention, it may be possible to increase the mileage of the electric vehicle by one charge and enhance the durability of the low-voltage battery, by performing the operation of the low-voltage DC/DC converter depending on the state of the low-voltage battery through feedback control utilizing the information of the low-voltage battery sensor.

The method of controlling a low-voltage DC/DC converter for an electric vehicle and the low-voltage DC/DC converter control system using the same according to the present invention is not limited as to the configurations and methods of the above-mentions embodiments, and may be configured by combining all or a portion of the embodiments as needed by a user.

In addition, it may be possible to prevent a start failure of a vehicle due to discharge by compensating dark current consumption and a battery discharge amount by drive of a black box or the like, and to enhance a life of a low-voltage battery. The present invention may use the low-voltage battery charged via a charge process of the vehicle by performing voltage control of a low-voltage DC/DC converter depending on a state of the low-voltage battery instead of voltage control of the low-voltage DC/DC converter depending on a driving mode of the vehicle. Therefore, mileage by one charge may be increased, compared to an existing vehicle. Furthermore, the present invention may improve durability of the low-voltage battery by determining a battery SOC and a battery liquid temperature state to adjust an output voltage of the low-voltage DC/DC converter.

While the present invention has been described with respect to the exemplary embodiments, it will be apparent to those skilled in the art that various changes and modifications may be made without departing from the spirit and scope of the invention as defined in the following claims.

What is claimed is:

1. A method of controlling a low-voltage DC/DC converter for a vehicle, comprising:
sensing information, by a battery sensor, regarding a low-voltage battery during a stop of the vehicle for each first period when the vehicle stops;
sensing information, by the battery sensor, of the low-voltage battery during driving of the vehicle;
operating, by a controller, a low-voltage DC/DC converter to charge the low-voltage battery for a predefined time when an error occurs in the battery sensor to sense the information of the low-voltage battery during the stop of the vehicle;
determining, by the controller, a charge time of the low-voltage battery based on first SOC values of the information regarding the low-voltage battery sensed for each first period when error in the battery sensor is not detected;
operating, by the controller, the low-voltage DC/DC converter for the determined charge time to charge the low-voltage battery;
determining, by the controller, target voltage values of the low-voltage DC/DC converter based on second state of charge (SOC) values and battery liquid temperature values of the information regarding the low-voltage battery during the driving of the vehicle; and
operating, by the controller, the low-voltage DC/DC converter based on the determined target voltage values,
wherein in the operating of the low-voltage DC/DC converter, the determination of the target voltage values is performed using a first target voltage table that includes voltage values of the low-voltage DC/DC converter which are respectively defined in advance with respect to the low-voltage battery SOC values and the battery liquid temperature values to increase a mileage of the vehicle by one charge,
wherein in the first target voltage table, when the low-voltage battery SOC values are in a range of about 80 to 90% and the battery liquid temperature values are in a range of about 0 to 40° C., the predefined voltage values of the low-voltage DC/DC converter are within a range of about 12.2 to 13.2V, and
wherein the controller includes a memory configured to store program instructions and a processor configured to execute the program instructions.

2. A low-voltage DC/DC converter control system comprising:
a low-voltage DC/DC converter mounted between a high-voltage battery and a low-voltage battery for a vehicle and configured to bi-directionally raise and lower a voltage; and
a controller having a memory configured to store program instructions and a processor configured to execute the program instructions, wherein the controller is configured to:
receive sensed information regarding the low-voltage battery during a stop of the vehicle for each first period when the vehicle stops;
receive sensed information regarding the low-voltage battery during driving of the vehicle;
operate the low-voltage DC/DC converter to charge the low-voltage battery for a predefined time when an error occurs in a battery sensor to sense the information regarding the low-voltage battery during the stop of the vehicle;
determine a charge time of the low-voltage battery based on first state of charge (SOC) values of the information regarding the low-voltage battery sensed for each first period when no error in the battery sensor is detected;
operate the low-voltage DC/DC converter for the determined charge time to charge the low-voltage battery;
determine target voltage values of the low-voltage DC/DC converter based on second SOC values and battery liquid temperature values of the information of the low-voltage battery during the driving of the vehicle; and
operate the low-voltage DC/DC converter based on the determined target voltage values,
wherein the determining of the target voltage values is performed using a first target voltage table that includes voltage values of the low-voltage DC/DC converter which are respectively defined in advance with respect to the low-voltage battery SOC values and the battery liquid temperature values to increase a mileage of the vehicle by one charge, and wherein in the first target voltage table, when the low-voltage battery SOC values are in a range of about 80 to 90% and the battery liquid temperature values are in a range of about 0 to 4° C., the predefined voltage values of the low-voltage DC/DC converter are within a range of about 12.2 to 13.2V.

3. The low-voltage DC/DC converter control system of claim 2, wherein the controller is further configured to:

receive sensed information regarding the low-voltage battery when an external charge power source is connected after a stop of the vehicle;

determine target voltage values of the low-voltage DC/DC converter based on third SOC values and battery liquid temperature values of the information of the low-voltage battery sensed during the connection of the external charge power source; and operate the low-voltage DC/DC converter based on the determined target voltage values.

4. The low-voltage DC/DC converter control system of claim 3, wherein the determining of the target voltage values is performed using a second target voltage table that includes voltage values of the low-voltage DC/DC converter which are respectively defined in advance with respect to the low-voltage battery SOC values and the battery liquid temperature values to reduce overcharge and gassing phenomena of the low-voltage battery.

5. A non-transitory computer readable medium containing program instructions executed by a controller having a memory configured to store program instructions and a processor configured to execute the program instructions, the computer readable medium comprising:

program instructions that control a battery sensor to sense information regarding the low-voltage battery during a stop of the vehicle for each first period when the vehicle stops;

program instructions that receive sensed information regarding the low-voltage battery during driving of the vehicle;

program instructions that operate the low-voltage DC/DC converter to charge the low-voltage battery for a predefined time when an error occurs in the battery sensor to sense the information regarding the low-voltage battery during the stop of the vehicle;

program instructions that determine a charge time of the low-voltage battery based on first state of charge (SOC) values of the information regarding the low-voltage battery sensed for each first period when no error in the battery sensor is detected;

program instructions that operate the low-voltage DC/DC converter for the determined charge time to charge the low-voltage battery;

program instructions that determine target voltage values of the low-voltage DC/DC converter based on second SOC values and battery liquid temperature values of the information of the low-voltage battery during the driving of the vehicle; and program instructions that operate the low-voltage DC/DC converter based on the determined target voltage values, wherein the determination of the target voltage values is performed using a first target voltage table that includes voltage values of the low-voltage DC/DC converter which are respectively defined in advance with respect to the low-voltage battery SOC values and the battery liquid temperature values to increase a mileage of the vehicle by one charge, and wherein in the first target voltage table, when the low-voltage battery SOC values are in a range of about 80 to 90% and the battery liquid temperature values are in a range of about 0 to 40° C., the predefined voltage values of the low-voltage DC/DC converter are within a range of about 12.2 to 13.2V.

6. The non-transitory computer readable medium of claim 5, further comprising:

program instructions that receive sensed information regarding the low-voltage battery when an external charge power source is connected after a stop of the vehicle;

program instructions that determine target voltage values of the low-voltage DC/DC converter based on third SOC values and battery liquid temperature values of the information of the low-voltage battery sensed during the connection of the external charge power source; and program instructions that operate the low-voltage DC/DC converter based on the determined target voltage values.

7. The non-transitory computer readable medium of claim 6, wherein the determination of the target voltage values is performed using a second target voltage table that includes voltage values of the low-voltage DC/DC converter which are respectively defined in advance with respect to the low-voltage battery SOC values and the battery liquid temperature values to reduce overcharge and gassing phenomena of the low-voltage battery.

* * * * *